Figure 1:
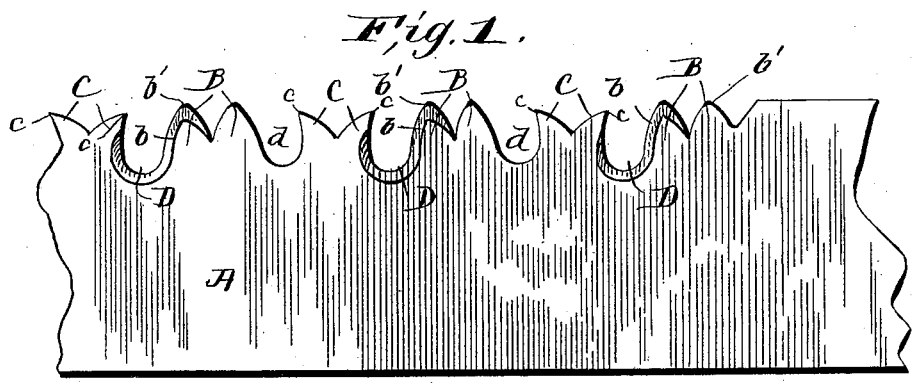

(No Model.)

J. WINGER.
SAW.

No. 404,242. Patented May 28, 1889.

Witnesses,

Inventor
John Winger
By his Attorneys
C. A. Snow & Co.

UNITED STATES PATENT OFFICE.

JOHN WINGER, OF HARRISON, ARKANSAS.

SAW.

SPECIFICATION forming part of Letters Patent No. 404,242, dated May 28, 1889.

Application filed August 22, 1888. Serial No. 283,434. (No model.)

*To all whom it may concern:*

Be it known that I, JOHN WINGER, a citizen of the United States, residing at Harrison, in the county of Boone and State of Arkansas, have invented new and useful Improvements in Saws, of which the following is a specification.

The invention relates to improvements in saws, pertaining more particularly to the formation of the teeth thereof; and it consists in the construction and novel combination of parts, hereinafter described, illustrated in the drawings, and pointed out in the appended claim.

Figure 2:
Figure 3:
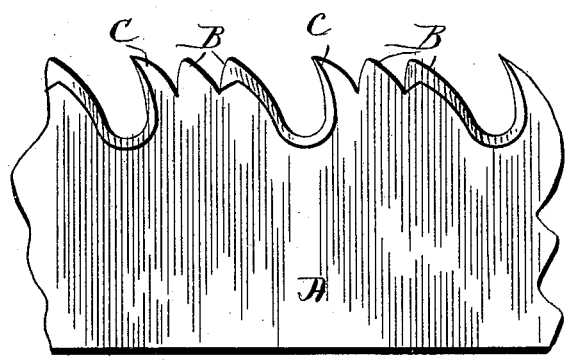

Figure 1 of the drawings represents a side view of a saw provided with teeth embodying the invention. Fig. 2 represents a sectional view of the same. Fig. 3 represents a side view of a modification of the saw, in which there is but one drag-tooth between each pair of cutting-teeth, and all the drag-teeth stand or incline in the same direction.

Referring to the drawings by letter, A designates a portion of a saw-blade provided on its edge with the cutter-teeth B, arranged in pairs, as shown, which pairs are separated by the drag-teeth, hereinafter described. The said cutter-teeth are slightly rounded at their points, and the members of each pair have their slightly-convex edges $b$ and their rounded points $b'$ beveled on opposite sides of the saw-blade, as shown.

C C are the drag-teeth, also arranged in pairs and situated midway between the pairs of cutter-teeth, the points $b'$ of which project slightly farther outward than those of the drag-teeth. The members of each pair of drag-teeth curve away from each other and toward the adjacent cutter-teeth, and their points $c$ are transverse and chisel-edged. Inward from said point each drag-tooth is slightly beveled on the same side of the saw as the cutter-tooth that it adjoins, the bevel extending across the recess D between said teeth. The space $d$ between the point of a drag-tooth and that of the adjoining cutter-tooth across said recess is just sufficient to allow the escape of the sawdust brought out by said drag-tooth.

In operation, as the members of each pair of cutting-teeth have opposite flat edges, the kerf will be cut with smooth surfaces and the drag-teeth will be given clearance and freedom of motion thereby, so that they can be extended as near to the adjacent cutter-teeth as desirable. The points of the cutter-teeth, being rounded and sharp, cut instead of scraping into the wood, and consequently start the surfaces of the kerfs smooth, which surfaces are kept smooth by the flat sides of said teeth, and, as the cutter-teeth project beyond the drag-teeth, the latter will not cut or will cut very little into the kerf, but will serve principally to remove the sawdust. As the members of the pairs of drag-teeth project in opposite directions, the saw is fitted for crosscutting. In the modification shown in Fig. 3 the drag-teeth all stand in one direction, and the saw is therefore fitted to cut in that direction only.

Having described my invention, I claim—

As a new article of manufacture, a saw-blade provided on its edge with the cutter-teeth arranged in pairs, the members of each pair having rounded points $b'$ and convex edges $b$ near said points, and being beveled on opposite sides, and the drag-teeth arranged in pairs between and adjacent to the cutter-teeth, the members of each pair of drag-teeth curving from each other and having transverse chisel-edges, and beveled on the same side as the adjacent cutter-tooth, the said bevel extending across the space between the cutter-tooth and the drag-tooth, as specified.

In testimony that I claim the foregoing as my own I have hereto affixed my signature in presence of two witnesses.

JOHN WINGER.

Witnesses:
PETER E. BLOW,
J. H. KROFT.